(12) United States Patent
Kato

(10) Patent No.: US 7,698,494 B2
(45) Date of Patent: Apr. 13, 2010

(54) ACCESS CONTROL DEVICE AND ACCESS CONTROL METHOD

(75) Inventor: Tetsuya Kato, Shizuoka (JP)

(73) Assignee: NEC Access Technica, Ltd., Shizuoka (JP)

(*) Notice: Subject to any disclaimer, the term of this patent is extended or adjusted under 35 U.S.C. 154(b) by 184 days.

(21) Appl. No.: 11/876,044

(22) Filed: Oct. 22, 2007

(65) Prior Publication Data

US 2008/0098140 A1 Apr. 24, 2008

(30) Foreign Application Priority Data

Oct. 23, 2006 (JP) ............................. 2006-287077

(51) Int. Cl.
*G06F 13/36* (2006.01)
(52) U.S. Cl. ..................... 710/315; 710/11; 710/305; 710/105
(58) Field of Classification Search ................ 710/105, 710/305–306, 113, 107, 315, 11
See application file for complete search history.

(56) References Cited

U.S. PATENT DOCUMENTS 5,931,932 A * 8/1999 Kanekal ..................... 710/113

2003/0110335 A1* 6/2003 Nguyen ..................... 710/107

FOREIGN PATENT DOCUMENTS

| JP | 2000259510 A | 9/2000 |
| JP | 2000322376 A | 11/2000 |
| JP | 2003316725 | 7/2003 |

OTHER PUBLICATIONS

Japanese Office Action issued Oct. 28, 2008 for JP Patent Application No. 2006-287077.

* cited by examiner

*Primary Examiner*—Mark Rinehart
*Assistant Examiner*—Kim T Huynh

(57) ABSTRACT

An access control device controls access to a first device and a second device. The first device is connected with a first bus conforming to a first standard and conforms to the first standard. The second device is connected with the first bus and conforms to a second standard. The access control device includes a first signal generator and a second signal generator. The first signal generator generates a first transaction start signal indicating start of a transaction for the first device. The second signal generator generates a second transaction start signal for the second device based on the first transaction start signal.

18 Claims, 4 Drawing Sheets

ACCESS CONTROL DEVICE AND ACCESS CONTROL METHOD

RELATED APPLICATIONS

This application is based on Japanese Patent Application No. JP 2006-287077 filed on Oct. 23, 2006, and including a specification, claims, drawings and summary. The disclosure of the above Japanese Patent Application is incorporated herein by reference in its entirety.

BACKGROUND OF THE INVENTION

1. Field of the Invention

The present invention relates to an access control device and an access control method.

2. Description of the Related Art

As an external expansion bus of a personal computer (hereinafter, referred to a PC), or, as an internal bus in various electronic equipment, a PCI (Peripheral Component Interconnect) bus is known. The PCI bus can connect to a plurality of PCI devices. For example, as shown in FIG. 4, a PCI host control unit 1 and a plurality of PCI devices 2A-2C connect to a PCI bus 3.

On the other hand, as a standard of a bus used for a PC card, a CardBus is known. The CardBus is configured based on a PCI. However, signal specifications of the PCI bus and the CardBus are not perfectly identical. Therefore, a device 4 based upon the CardBus standard (hereinafter, referred to as a CardBus device) such as the PC card cannot be connected to the PCI bus directly. Accordingly, for example, as shown in FIG. 5, if the CardBus device 4 and the PCI host control unit 1 are connected, a PCI-CardBus bridge 5 has to be interposed therebetween. The PCI-CardBus bridge 5 is large-sized and costly. Only one CardBus device can be connected to one PCI-CardBus bridge 5.

Here, reason why CardBus cannot include a plurality of CardBus will be described below. The PCI host control unit 1 accesses the PCI devices 2A-2C via the PCI bus 3. When the PCI devices 2A-2C are recognized, the PCI host control unit 1 performs configuration processing. A PCI includes an address space of 4 G bytes. When the configuration processing is performed, an access region of each PCI devices 2A-2B is assigned to one of areas in the address space with 4 G bytes. For example, the access region of the PCI device 2A is assigned to 0x10000000-0x1000FFFF (0x: a hexadecimal number), and the access region of the PCI device 2B is assigned to 0x10010000-0x10010FFF, and the access region of the PCI device 2C is assigned to 0x20000000-0x20007FFF.

Information concerning the access region of each PCI devices 2A-2C is stored in a configuration register. In the configuration processing, the PCI host control unit 1 reads a value of the configuration register of each PCI devices 2A-2C. By performing the configuration processing, PCI devices 2A-2C can distinguish whether predetermined access is an access addressed to itself as an address on the PCI. Accordingly, even when a plurality of PCI devices 2A-2C are connected to a PCI bus 3, signals of the devices does not conflict.

After the configuration processing is completed, the individual address space is assigned to each PCI devices 2A-2C. On the other hand, each configuration register itself of each PCI devices 2A-2C is mapped in an identical address space. Therefore, accesses to PCI devices 2A-2C may conflict in the configuration processing. Thus a PCI includes an IDSEL signal which is effective only during the configuration processing. The IDSEL signal is a signal showing a configuration register of a device to be accessed. The IDSEL signal avoids an access conflict between the PCI devices 2A-2C during the configuration processing.

However, in the CardBus standard, the IDSEL signal mentioned above is not defined. Therefore, when a CardBus device 4 shown in FIG. 5 is connected to a PCI bus 3 shown in FIG. 4, an access conflict occurs between the CardBus device 4 and the PCI devices 2A-2C in the configuration processing.

Japanese Patent Application Laid-Open No. 2003-316725 discloses a configuration for using a device conforming to the PC card standard as a PCI device without using a bridge. In such configuration, a CPU and a bus change circuit controlled by the CPU are provided. When a PC card compliant device is accessed, a C/BE order bus is connected to the PC card compliant devices. On the other hand, when other device is accessed, the C/BE order bus is shut off from the PC card compliant device. However, in the aforementioned constitution, whenever the device is accessed, the CPU has to control the bus change circuit.

SUMMARY OF THE INVENTION

An exemplary object of the present invention is to provide an access control device and an access control method which can simplify a device configuration without increasing a control load.

In an exemplary aspect of the invention, an access control device controls access to a first device and a second device. The first device is connected with a first bus conforming to a first standard and conforms to the first standard. The second device is connected with the first bus and conforms to a second standard. The access control device includes a first signal generator and a second signal generator. The first signal generator generates a first transaction start signal indicating start of a transaction for the first device. The second signal generator generates a second transaction start signal for the second device based on the first transaction start signal.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Figure 1:
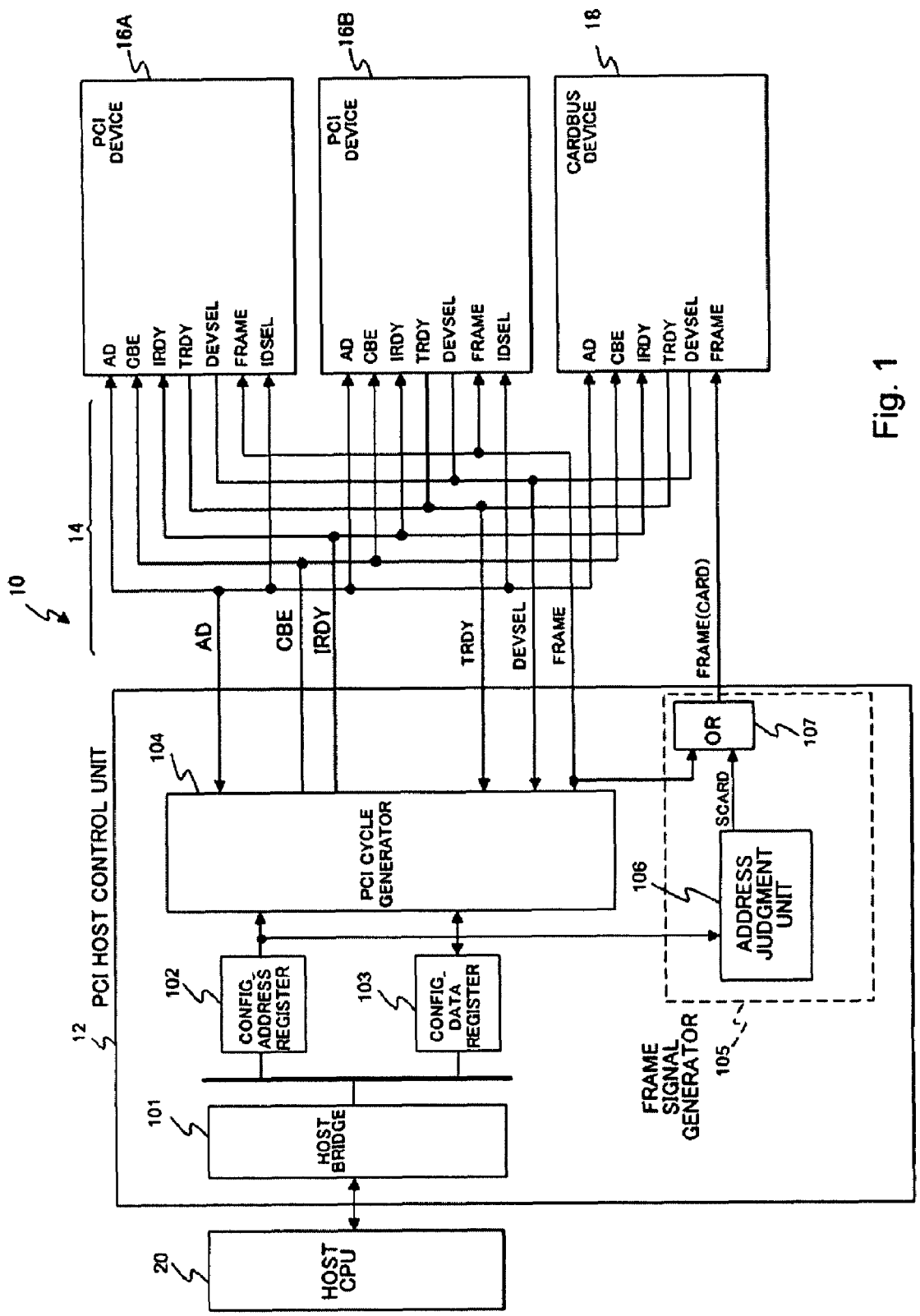
FIG. 1 shows an example of control block diagram of a PCI control system according to a first embodiment of the present invention.

Hereinafter, exemplary embodiments of the present invention will be described in detail with reference to drawings. FIG. 1 shows an example of a control block diagram of a PCI control system 10 according to a first exemplary embodiment of the present invention. The PCI control system 10 includes a PCI host control unit 12, PCI devices 16A and 16B, a CardBus device 18 and a host CPU 20. The PCI host control unit 12 connects to the PCI devices 16A and 16B and the CardBus device 18 via a PCI bus 14. The PCI host control unit 12 accesses the PCI devices 16A and 16B and the CardBus device 18 by directions of the host CPU 20. The PCI host control unit 12 is a kind of an access control device.

The PCI host control unit 12 includes a host bridge 101, a CONFIG_ADDRESS register 102, a CONFIG_DATA register 103, a PCI cycle generator 104 and a FRAME signal generator 105 for a CardBus device. The Host bridge 101 is connected to the host CPU 20, the CONFIG_ADDRESS register 102 and the CONFIG_DATA register 103. The CONFIG_ADDRESS register 102 and the CONFIG_DATA register 103 are connected to the PCI cycle generator 104. The PCI cycle generator 104 generates various PCI cycles (transaction) on the PCI bus 14 based on contents stored in these registers.

A signal on the PCI bus 14 will be described. AD means an address and a data signal. CBE means a command byte enable signal. IRDY means a signal indicating a completion of a data transfer preparation of an initiator. TRDY means a signal indicating a completion of a target preparation. DEVSEL means a signal indicating during transaction operation from a selected target. FRAME means a signal indicating transaction starting. For example, FRAME becomes active at a low level. IDSEL means a signal indicating a configuration cycle. For example, IDSEL becomes active at a high level.

A configuration register includes an address space with 256 bytes. Accordingly, access to the configuration register is performed by controlling eight bit addresses. For example, when data of 0x11223344 is written in a configuration register of address 0x00, the host CPU 20 writes 0x00000000 in the CONFIG_ADDRESS register 102 and next, writes 0x11223344 in the CONFIG_DATA register 103. Thereby, a write transaction in the address 0x00 occurs.

On the other hand, when data is read from the configuration register with address 0x10, the host CPU 20 writes 0x10000000 in the CONFIG_ADDRESS register 102. Thereby a read transaction in the address 0x10 occurs.

When the PCI host control unit 12 accesses the CardBus device 18, the FRAME signal generator 105 generates a FRAME (CARD) signal for the CardBus device 18. The FRAME signal generator 105 includes an address judgment unit 106 and an OR gate 107. The address judgment unit 106 judges whether an address written in the CONFIG_ADDRESS register 102 is an address for accessing the CardBus device 18 or an address for the accessing the PCI devices 16A and 16B. Specifically, the address judgment unit 106 judges whether an address written in the CONFIG_ADDRESS register 102 accords with an address of the CardBus device 18. An address judgment unit 106 outputs a judgment result signal SCARD at a low level when the both addresses are identical and outputs the judgment result signal SCARD at a high level when the addresses are not identical. The judgment result signal SCARD of the address judgment unit 106 and the FRAME signal from the PCI cycle generator 104 enter the OR gate 107. The OR gate 107 conducts logical OR operation regarding the input signals. The OR gate 107 outputs the logical addition result to the CardBus device 18 as a FRAME (CARD) signal.

Figure 2A:
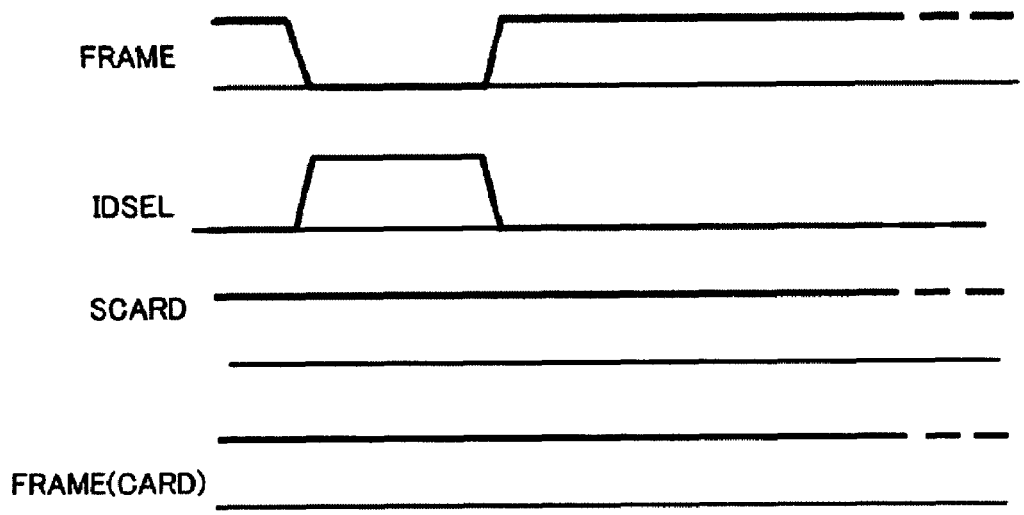
FIG. 2A shows an example of a timing chart of each signal when the PCI host control unit shown in FIG. 1 accesses a PCI device.

FIG. 2A shows an example of timing charts of signals which occur when the PCI host control unit 12 accesses a predetermined PCI device, for example, a PCI device 16A during configuration processing. When the host CPU 20 accesses the CONFIG_ADDRESS register 102 and the CONFIG_DATA register 103, the PCI cycle generator 104 starts a transaction on the PCI. Specifically, the PCI cycle generator 104 outputs the FRAME signal of a low level (i.e. active signal). IDSEL of the PCI device 16A which is an access target is set to a high level (i.e. active) as shown in FIG. 2A, and IDSEL of a PCI device which is not an access target is set to a low level (i.e. inactive, not shown). Since the CardBus device 18 is not equipped with IDSEL, the CardBus device 18 is not affected by ISDEL at all. The address judgment unit 106 judges whether or not an address stored in the CONFIG_ADDRESS register 102 accords with an address of the CardBus device 18. When the both addresses are not in accord with each other, that is, when any one of PCI device 16A and PCI device 16B are accessed, the address judgment unit 106 outputs the judgment result signal SCARD with a high level. Therefore, the OR gate 107 outputs the FRAME (CARD) signal with a high level regardless of a level of the FRAME signal from the PCI cycle generator 104. The FRAME signal and the FRAME (CARD) signal become active when the signals are at a low level. That is, when an access target is one of the PCI device 16A and the PCI device 16B, the FRAME (CARD) signal becomes inactive, and the CardBus device 18 does not reply to an access. Therefore, even if the CardBus device 18 is connected to the PCI bus 14, either of the PCI device 16A and the PCI device 16B is accessed certainly.

Figure 2B:
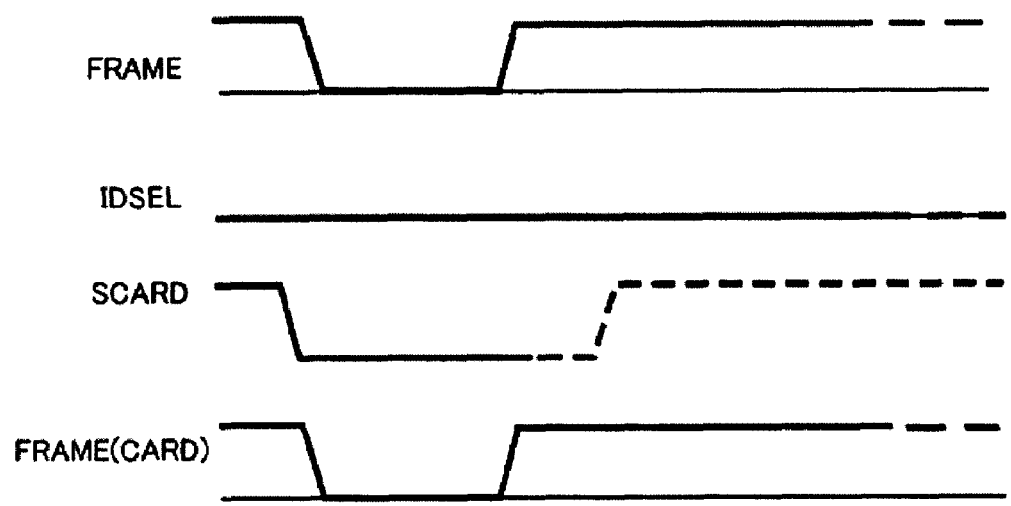
FIG. 2B shows an example of a timing chart of each signal when the PCI host control unit shown in FIG. 1 accesses a CardBus device.

FIG. 2B shows an example of timing charts of signals which occur when the PCI host control unit 12 accesses the CardBus device 18 during configuration processing. When the host CPU 20 accesses the CONFIG_ADDRESS register 102 and the CONFIG_DATA register 103, the PCI cycle generator 104 starts a transaction on the PCI. Specifically, the PCI cycle generator 104 outputs the FRAME signal with a low level (i.e. active signal). The address judgment unit 106 judges whether or not an address stored in the CONFIG_ADDRESS register 102 accords with an address of the CardBus device 18. When the both addresses are in accord with each other, that is, when the CardBus device 18 is accessed, the address judgment unit 106 outputs a judgment result signal SCARD with a low level. Therefore, the OR gate 107 outputs the FRAME signal from the PCI cycle generator 104 to the CardBus device 18 as the FRAME (CARD) signal. That is, the FRAME (CARD) signal with a low level (i.e. active signal) enters the CardBus device 18. On the other hand, the FRAME signal with a low level also enters the PCI device 16A and the PCI device 16B. However, because both of the PCI device 16A and the PCI device 16B are not targets to be accessed, the level of the IDSEL signal becomes low (i.e. inactive) as shown in FIG. 2B. Therefore, the PCI devices 16A and 16B do not respond to the access thereto. That is, even if one or more PCI devices (i.e. PCI device 16A or PCI device 16B) connect to the PCI bus 14, the CardBus device 18 is accessed certainly.

As described above, in the PCI control system 10 of the first exemplary embodiment of the present invention, the FRAME (CARD) signal to the CardBus device is generated based on the FRAME signal for the PCI devices 16A and 16B. The CardBus device 18 can recognize starting of a transaction thereto in the configuration processing according to the FRAME (CARD) signal, even if the CardBus device 18 does not include IDSEL. That is, in the PCI control system 10, the PCI devices 16A and 16B and the CardBus device 18 can coexist on the identical PCI bus 14 without using PCI-CardBus bridge. Since PCI-CardBus bridge becomes unnecessary, device configuration becomes simple and low-cost. Since the FRAME (CARD) signal is generated automatically without an operation of the host CPU 20, a controlling load of devices can be decreased.

An example of the FRAME signal generator 105 provided in the PCI host control unit 12 is described above. The FRAME signal generator 105, however, can be an external device of the PCI host control unit 12.

A function of the PCI host control unit 10 can be obtained by executing a program on a program control processor. The program can include the address judgment unit 106 and the OR gate 107 as one program part thereof.

The FRAME signal generator 105 is not necessarily limited to a circuit including the address judgment unit 106 and the OR gate 107 as mentioned above. The FRAME signal generator 105 can be made of other circuit configuration which includes an identical function. For example, when a FRAME signal is active at high level, the OR gate 107 may be changed to an AND gate.

Figure 3:
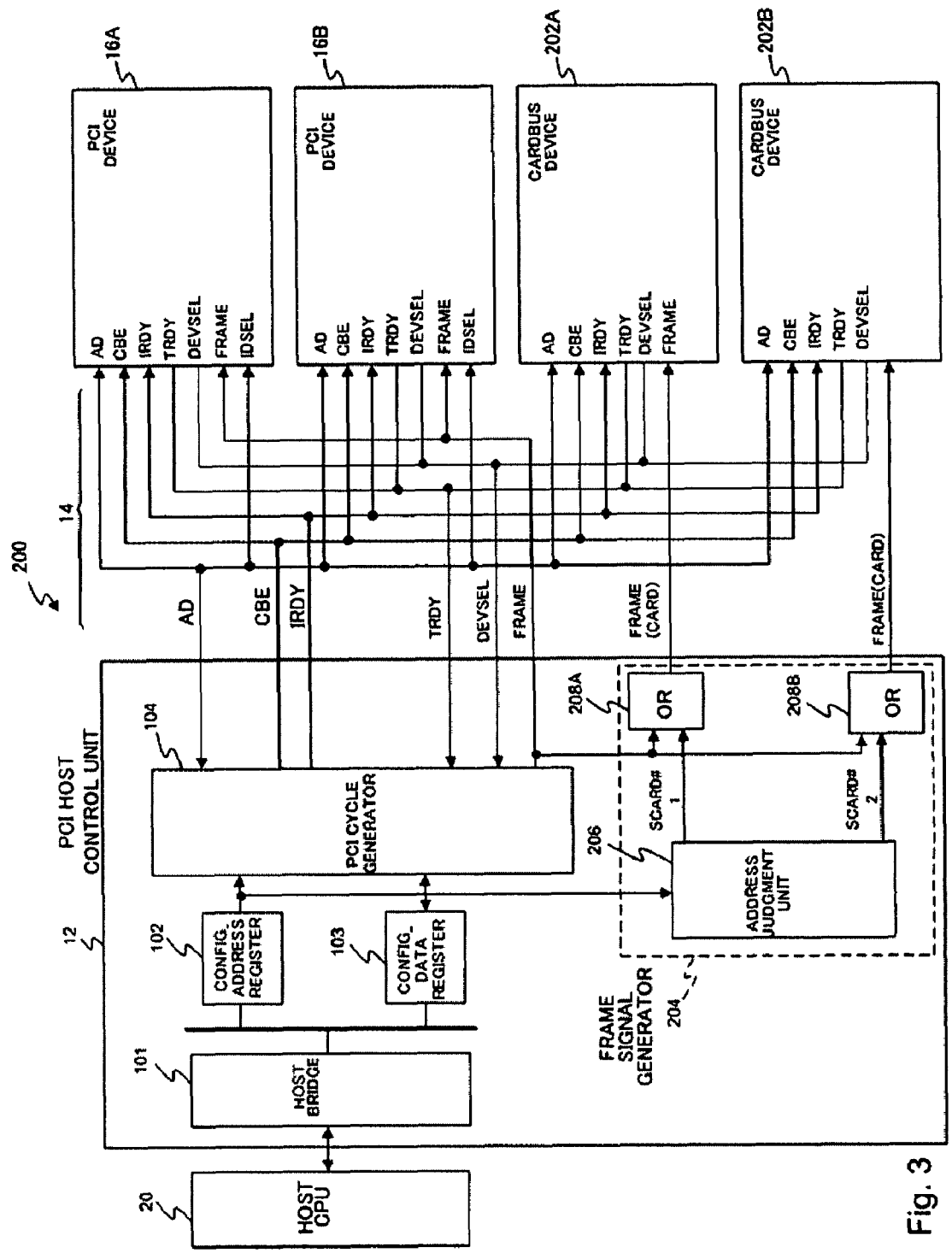
FIG. 3 shows an example of control block diagram of a PCI control system according to a second embodiment of the present invention.
Figure 4:
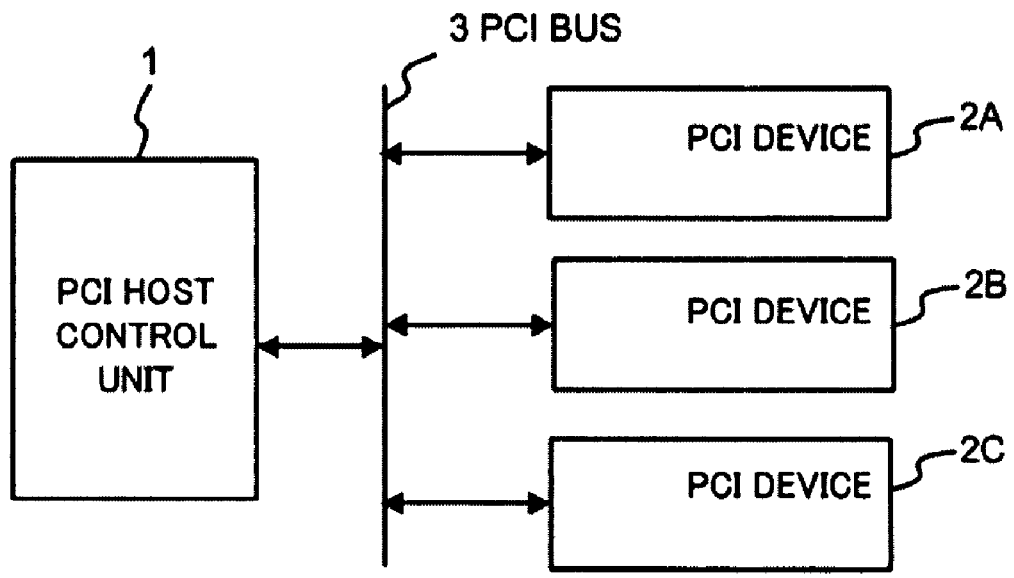
FIG. 4 shows a control block diagram of a general PCI control system connecting a plurality of PCI devices to a PCI bus.
Figure 5:
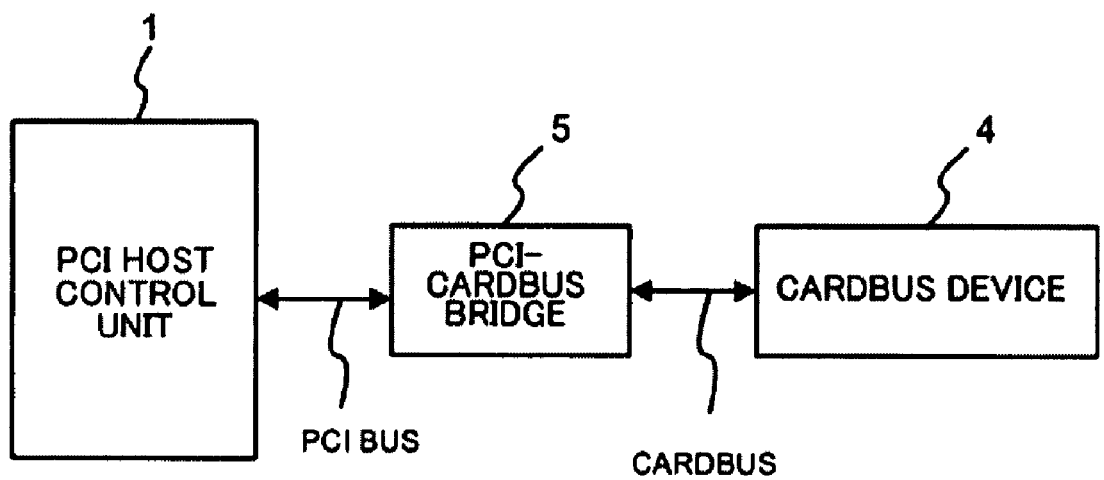
FIG. 5 shows a control block diagram of a general PCI control system connecting CardBus compliant device to a PCI bus via a bridge.

FIG. 3 shows an example of control block diagram of a PCI control system 200 according to a second exemplary embodiment of the present invention. The PCI control system 200 includes a plurality of CardBus devices (i.e. 202A and 202B in FIG. 3) which are connected to the PCI bus 14. A FRAME signal generator 204 of the PCI control system 200 includes an address judgment unit 206 and OR gates 208A and 208B. The address judgment unit 206 generates judging result signals SCARD#1 and SCARD#2 for CardBus devices 202A and 202B respectively. Each judging result signal SCARD#1 and SCARD#2 are inputted to the OR gates 208A and 208B respectively. A FRAME signal from the PCI cycle generator 104 also enters the OR gates 208A and 208B in common. Each of the OR gates 208A and 208B perform logical OR operations for the FRAME signal and each judging result signal SCARD#1 and SCARD#2. The OR gates 208A and 208B output FRAME (CARD) signals, which are results of the logical OR operations, to the CardBus devices 202A and 202B respectively. In the exemplary embodiment, the PCI bus 14 can include a plurality of CardBus devices 202A and 202B.

The number of the PCI device and the CardBus device connected to the PCI bus 14 may be set to three or more respectively.

According to the third exemplary embodiment of the present invention, when a CardBus compliant device connects to a bus, the bus control unit generates a transaction start signal to the CardBus compliant device using a transaction start signal which indicates starting of transaction for accessing a device. More specifically, the bus control unit judges whether or not an address for accessing a device is an address for accessing a CardBus compliant device. When an address for accessing a device is an address for the accessing CardBus compliant device, the bus control unit outputs a transaction start signal to the CardBus compliant device as a transaction start signal only for the CardBus compliant device.

For example, the transaction start signal is a FRAME signal on the PCI supplied to a device other than the CardBus compliant device in common, and each of devices other than the CardBus compliant device is identified by an IDSEL signal. An address for accessing a device is stored in the CONFIG_ADDRESS register.

When an device other than the CardBus compliant device is accessed, the bus control unit generates a transaction start signal indicating starting of transaction thereto. On the other hand, when a CardBus compliant device is accessed, the bus control unit generates a transaction start signal to the CardBus compliant device using the transaction start signal above mentioned.

Only when accessing to a PC card, the bus control unit includes a means to generate a FRAME signal for a PC card from a FRAME signal of a PCI. For example, when it is judged that an access destination is the PC card by monitoring the CONFIG_ADDRESS register, the bus control unit outputs the FRAME signal, which is a FRAME signal for PC cards, to the PC card.

In the above-mentioned embodiment, a transaction start signal to CardBus compliant devices is generated using a transaction start signal. By the signal, the host CPU can access an individual CardBus compliant device. Therefore, control of the host CPU becomes unnecessary, and load is reduced. Since PCI-CardBus bridge becomes unnecessary when a PC card is connected, it is possible to reduce cost, and reduce the restrictions of part arrangement at a time of hardware design.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

Further, it is the inventor's intention to retain all equivalents of the claimed invention even if the claims are amended during prosecution.

What is claimed is:

1. An access control device for controlling access to a first device connected with a first bus conforming to a first standard, said first device conforming to said first standard and access to a second device connected with said first bus, said second device conforming to a second standard, said access control device comprising:

a first signal generator which generates a first transaction start signal indicating start of a transaction for said first device; and a second signal generator which generates a second transaction start signal for said second device based on said first transaction start signal, wherein the first signal generator generating the first transaction start signal and the second signal generator generating the second transaction start signal are adapted to and result in the first device communicating with the second device without employing a first standard-second standard bridge even though the first device conforms to the first standard and the second device conforms to the second standard, the second standard being different than the first standard, where otherwise the first device is unable to communicate with the second device due to the second standard being different than the first standard.

2. The access control device according to claim 1, wherein said second signal generator generates said second transaction start signal upon occurrence of an access to said second device.

3. The access control device according to claim 1, wherein said second signal generator suspends generating said second transaction start signal upon occurrence of an access to said first device.

4. The access control device according to claim 1, wherein said second signal generator includes an address judgment unit which judges whether or not an address of a device to be accessed accords with an address of said second device and a gate unit which can generate said second transaction start signal based on said first transaction start signal and a judgment of said address judgment unit and can outputs said second transaction start signal to said second device.

5. The access control device according to claim 1, wherein said first bus is a PCI (Peripheral Component Interconnect) bus.

6. The access control device according to claim 5, wherein said first transaction start signal is a first FRAME signal.

7. The access control device according to claim 6, wherein said second signal generator judges whether or not an address stored in a CONFIG ADDRESS register accords with an address of said second device and can generate a second FRAME signal for said second device based on said first FRAME signal and a judgment thereof.

8. The access control device according to claim 1, wherein a plurality of said second devices are connected with said first bus, and said second signal generator generates said second transaction start signal for a second device to be accessed in said plurality of second devices.

9. The access control device according to claim 8, wherein said second signal generator includes an address judgment unit which judges whether or not an address of a device to be accessed accords with an address of each of said plurality of second devices and a gate unit which can generate said second transaction start signal for said second device to be accessed based on said first transaction start signal and a judgment of said address judgment unit and can output said second transaction start signal to said second device.

10. An access control method for controlling an access to a second device conforming to a second standard, said second device being connected with a first bus conforming to a first standard, the method comprising:
    generating a first transaction start signal for a first device conforming to said first standard and connecting with said first bus; and
    generating a second transaction start signal for said second device based on said first transaction start signal, wherein generating the first transaction start signal and generating the second transaction start signal are adapted to and result in the first device communicating with the second device without employing a first standard-second standard bridge even though the first device conforms to the first standard and the second device conforms to the second standard, the second standard being different than the first standard, where otherwise the first device is unable to communicate with the second device due to the second standard being different than the first standard.

11. The access control method according to claim 10, wherein said second transaction start signal is generated upon occurrence of an access to said second device.

12. The access control method according to claim 10, wherein generation of said second transaction start signal is suspended upon occurrence of an access to said first device.

13. The access control method according to claim 10, wherein said generating a second transaction start signal includes judging whether or not an address of a device to be accessed accords with an address of said second device, generating said second transaction start signal based on said first transaction start signal and matching of said addresses, and outputting said second transaction start signal to said second device.

14. The access control method according to claim 10, wherein said first bus is a PCI (Peripheral Component Interconnect) bus.

15. The access control method according to claim 14, wherein said first transaction start signal is a first FRAME signal.

16. The access control method according to claim 15, wherein said generating a second transaction start signal includes judging whether or not an address stored in a CONFIG ADDRESS register accords with an address of said second device and generating a second FRAME signal for said second device based on said first FRAME signal and matching of said addresses.

17. The access control method according to claim 10, wherein a plurality of said second devices are connected with said first bus, and said second transaction start signal for a second device to be accessed in said plurality of second devices is generated.

18. The access control method according to claim 10, wherein a plurality of said second devices are connected with said first bus, and
    said generating a second transaction start signal includes judging whether or not an address of a device to be accessed accords with an address of each of said plurality of second devices, generating said second transaction start signal for said second device to be accessed based on said first transaction start signal and matching of said addresses, and outputting said second transaction start signal to said second device.

* * * * *